United States Patent [19]

Hoge et al.

[11] Patent Number: 5,465,187
[45] Date of Patent: Nov. 7, 1995

[54] MAGNETIC TAPE CARTRIDGE HAVING LEADER BLOCK RETAINER MECHANISM

[75] Inventors: David T. Hoge, Westminster; Michael V. Konshak, Louisville; John C. Owens, Arvada, all of Colo.; Michael W. Johnson, Cottage Grove, Minn.; George P. Rambosek, Shafer, Minn.; Thomas J. Rieger, St. Paul, Minn.

[73] Assignee: Storage Technology Corporation, Louisville, Colo.

[21] Appl. No.: 323,610

[22] Filed: Oct. 17, 1994

Related U.S. Application Data

[63] Continuation of Ser. No. 952,950, Sep. 25, 1992, abandoned.

[51] Int. Cl.[6] ............... G11B 23/027; G11B 23/037; G11B 23/02
[52] U.S. Cl. ........................... 360/132; 242/348.2
[58] Field of Search ............... 360/132, 95, 96.5; 242/195, 197, 199, 194, 332.4, 348.3, 348, 348.2; 369/268, 75.1, 79

[56] References Cited

U.S. PATENT DOCUMENTS

| | | | |
|---|---|---|---|
| 3,170,651 | 2/1965 | Galke et al. | 242/55.12 |
| 3,856,228 | 12/1974 | Hosono et al. | 242/71.8 |
| 4,414,427 | 11/1983 | Sluter et al. | 174/65 R |
| 4,512,619 | 4/1985 | Dechelette | 439/449 |
| 4,716,477 | 12/1987 | Uehara | 360/97 |
| 4,752,844 | 6/1988 | Suzuki | 360/85 |
| 4,918,551 | 4/1990 | Yoshida et al. | 360/96.5 |
| 4,977,474 | 12/1990 | Oishi et al. | 360/132 |
| 5,232,180 | 8/1993 | Hoge et al. | 360/95 |
| 5,251,090 | 10/1993 | Cheatham et al. | 360/132 |
| 5,261,626 | 11/1993 | Hoge et al. | 242/348.2 |
| 5,303,875 | 4/1994 | Hoge et al. | 242/348.3 |

FOREIGN PATENT DOCUMENTS

| | | | |
|---|---|---|---|
| 472983 | 4/1951 | Canada | 174/65 R |
| 0086394A1 | 8/1983 | European Pat. Off. | |
| 1311514 | 12/1961 | France | |
| 04157655 | 5/1992 | Japan | |
| 0293240 | 7/1928 | United Kingdom | 439/449 |

Primary Examiner—Stuart S. Levy
Assistant Examiner—William J. Klimowicz
Attorney, Agent, or Firm—Duft, Graziano & Forest

[57] ABSTRACT

The improved magnetic tape cartridge includes a leader block retainer mechanism that provides a positive locking function to automatically secure the leader block in place in the opening of the magnetic tape cartridge housing. The leader block retainer mechanism comprises detent members springably attached to both the top and bottom sides of the housing, juxtaposed to the opening, to engage corresponding features on the leader block to resist withdrawal of the leader block from the housing.

13 Claims, 2 Drawing Sheets

ન,465,187

MAGNETIC TAPE CARTRIDGE HAVING LEADER BLOCK RETAINER MECHANISM

CROSS-REFERENCE TO RELATED APPLICATION

This application is a file wrapper continuation of prior, now abandoned, application Ser. No. 07/952,950, filed Sep. 25, 1992. Applicants claim entitlement to the earlier Sep. 25, 1992 filing date pursuant to 35 U.S.C. § 120.

FIELD OF THE INVENTION

This invention relates to magnetic recording and, in particular, to a magnetic tape cartridge that includes a leader block retainer mechanism to securely retain the leader block within the magnetic tape cartridge when the cartridge is not in use.

PROBLEM

It is a problem in the field of ½" single reel magnetic tape cartridges, such as IBM's 3480-type magnetic tape cartridge, to prevent the leader block from exiting the opening in the magnetic tape cartridge when the cartridge is not in use. The 3480-type magnetic tape cartridge is an industry standard tape cartridge that consists of a substantially rectangular housing of predetermined dimensions within which is rotatably attached a single reel of magnetic tape. One end of the magnetic tape is secured to a leader block that is accessible to a tape threading arm in the tape drive via an opening in one corner of the magnetic tape cartridge housing. When the magnetic tape is completely wound on the reel in the magnetic tape cartridge, the leader block is drawn into the opening of the housing a sufficient distance to block the opening. The force required to withdraw the leader block from the tape cartridge opening is a function of the length of the leader block and the size of the opening in the magnetic tape cartridge. The dimensions of the leader block and the opening in the magnetic tape cartridge are variable due to the variability of the molding and assembly processes, which results in significant departures from the nominal force required to withdraw the leader block.

The existing 3480-type magnetic tape cartridge is equipped with a simple leader block latch to prevent the withdrawal of the leader block and the attached tape from the magnetic tape cartridge. This latch is an integral part of the housing and is located at the opening in the magnetic tape cartridge in a position that exposes the latch to damage. If the magnetic tape cartridge is dropped, the latch can be damaged and the magnetic tape cartridge rendered inoperable. Also, if the leader block does not fully engage this latch due to the tape threading arm failing to place the leader block fully within the housing, the leader block moves freely and, as the 3480-type magnetic tape cartridge is being handled by the user, or maintained in storage, or being shipped between locations, the leader block can inadvertently be extracted from the magnetic tape cartridge, thereby exposing a length of magnetic tape to damage.

SOLUTION

The above described problems are solved and a technical advance achieved in the field by the magnetic tape cartridge that is equipped with a redundant leader block retainer mechanism. This leader block retainer mechanism provides a positive locking function that automatically mechanically secures the leader block in place in the opening of the magnetic tape cartridge housing. The leader block can not be withdrawn therefrom by the tape drive or by a user without the application of a force of predetermined magnitude to the leader block.

The leader block retainer mechanism preferably comprises a plurality of detent springs, located on the top and bottom of the inside of the magnetic tape cartridge housing, juxtaposed to the leader block opening in the magnetic tape cartridge housing. The detents are engagable with corresponding features on the leader block to prevent its extraction from the magnetic tape cartridge housing. These corresponding features also act as guides for accurately threading the magnetic tape into the tape drive takeup reel. One embodiment uses a pair of detent springs, one located on each of the top and bottom of the inside of the magnetic tape cartridge housing juxtaposed to the leader block opening in the magnetic tape cartridge housing, to provide additional reliability since the loss of one detent spring does not cause inoperability of the retainer mechanism. In addition, the detent springs can preferably be manufactured as an integral part of the magnetic tape cartridge housing molding operation.

DETAILED DESCRIPTION

Figure 1:
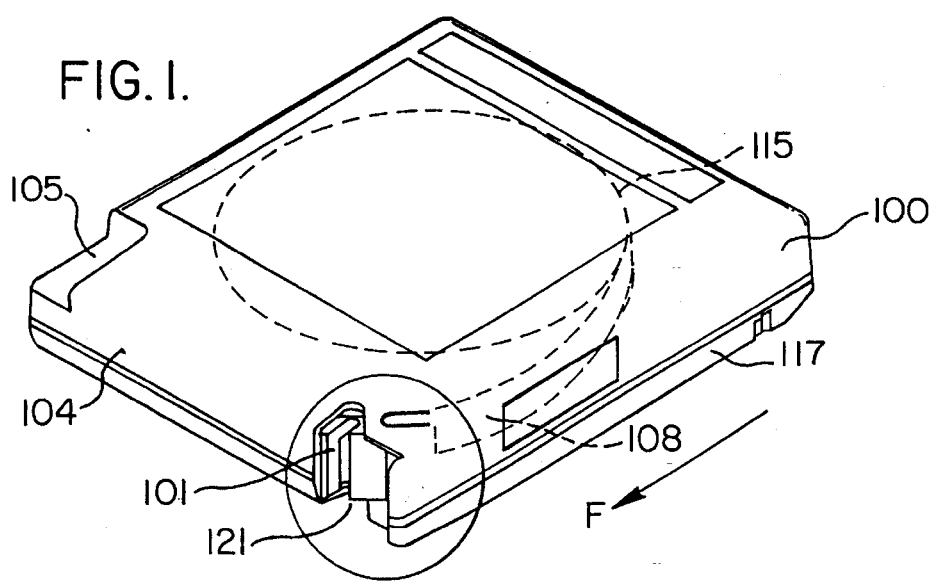
FIG. 1 illustrates, in perspective view, the magnetic tape cartridge and the leader block retainer mechanism of the present invention.
Figure 4:
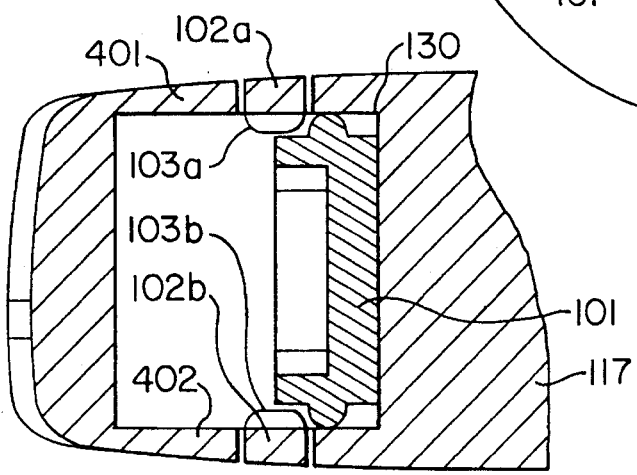
FIGS. 3 and 4 illustrate top and end views of the leader block retainer mechanism of the present invention.
Figure 3:
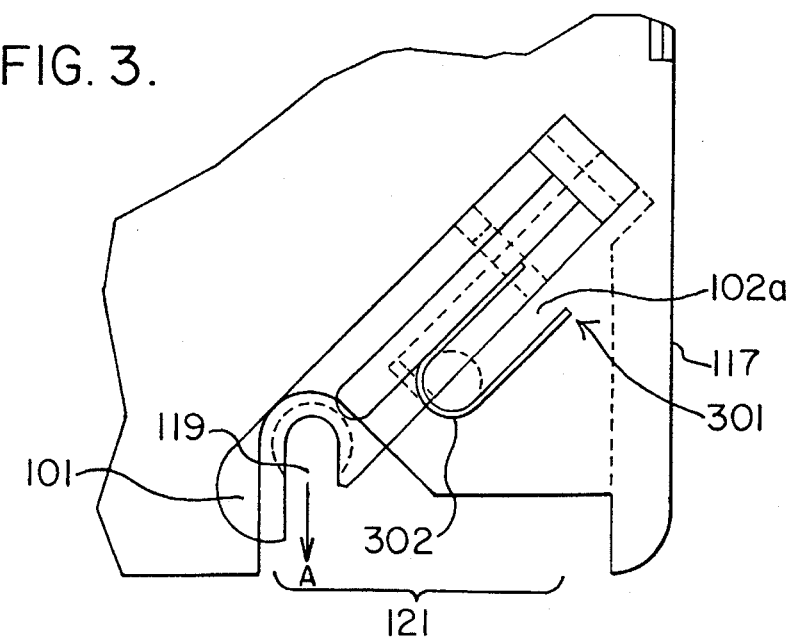

One type of computer system tape transport presently in use makes use of magnetic tape cartridges, having the form factor known as the IBM 3480-type magnetic tape cartridge form factor, as the data storage media. FIG. 1 illustrates a perspective view of a ½" single reel magnetic tape cartridge 100 equipped with the leader block retainer mechanism of the present invention, while FIGS. 3 and 4 illustrate top and end views of the same mechanism. The magnetic tape cartridge 100 consists of a substantially rectangular exterior housing 117 that has a front side 104, that includes an opening 121 through which a tape drive accesses the magnetic tape 108 contained therein. The magnetic tape cartridge 100 is inserted into the tape drive in direction F, front side 104 first. The magnetic tape cartridge 100 contains a single supply reel 115 on which the magnetic tape 108 is wound in a counterclockwise direction. A drive spindle (not shown) is attached to the bottom side of tape supply reel 115 to engage the supply reel drive mechanism in the tape drive.

As viewed in FIG. 1, the magnetic tape cartridge 100 includes an opening 121 in the right side of the front 104 of the cartridge housing 117 through which the tape drive tape threading mechanism accesses the magnetic tape 108. Access to magnetic tape 108 is provided by a leader block 101 attached to one end of the magnetic tape 108 that is stored in the magnetic tape cartridge 100. The left front corner 105 of the front 104 of the exterior housing 117 optionally can be angled or include a recess in order to mechanically denote the proper orientation of the magnetic tape cartridge 100 for loading into a tape drive.

Leader Block

Figure 2:
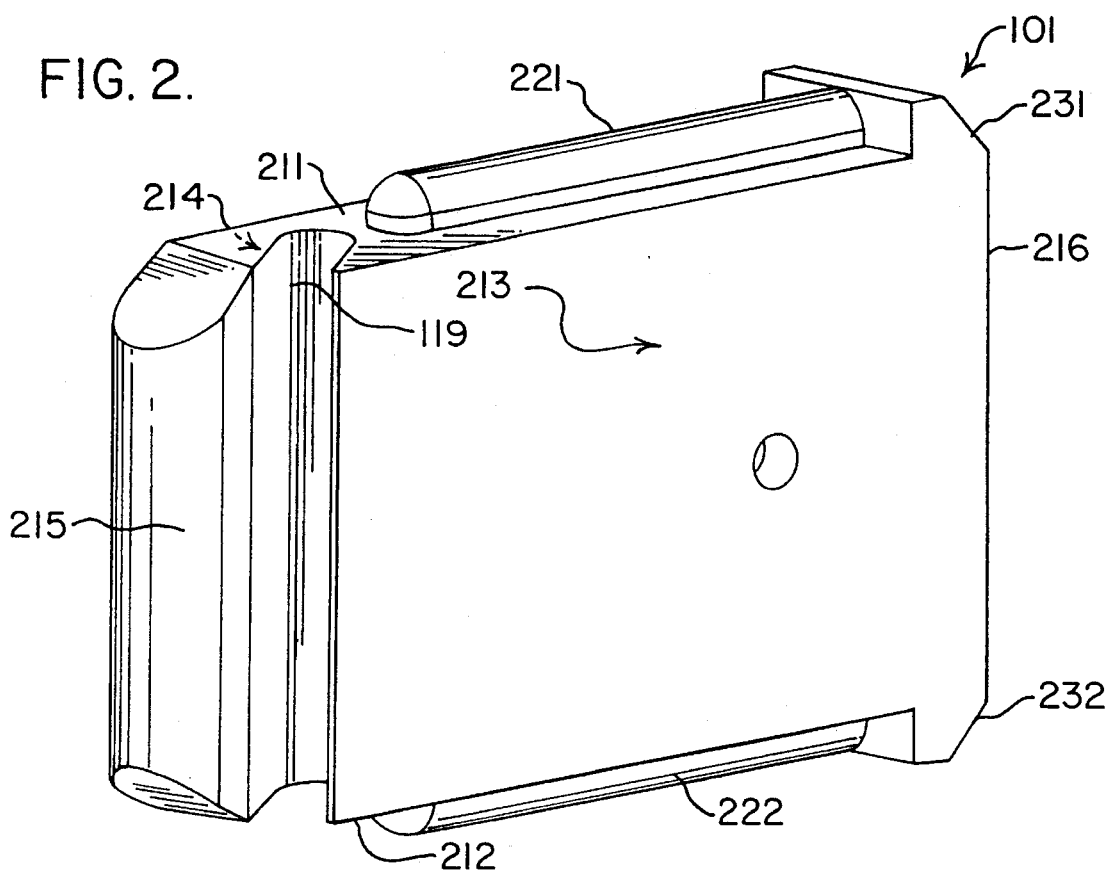
FIG. 2 illustrated in perspective view the details of a leader block.

Leader block 101 is shown in perspective view in FIG. 2. Magnetic tape 108 has a first end which extends through the opening 121 in the magnetic tape cartridge 100 to enable the associated tape drive to extract magnetic tape 108 from the magnetic tape cartridge 100 by means of leader block 101 which is attached to magnetic tape 108. Leader block 101 has a top 211, a bottom 212, a front 213, a back 214, a first side 215 and a second side 216. The top 211 and bottom 212 of leader block 101 include a first retaining projection 221 and a second retaining projection 222, respectively, which are semicylindrical ridges located on top 211 and bottom 212 of leader block 101.

Leader block 101 also includes a tape threading arm socket 219 located on the front 213 thereof juxtaposed to first side 215. Tape threading arm socket 119 is adapted to receive a tape threading arm pin (not shown). The tape threading arm socket 119 comprises a substantially semicylindrical socket extending from the top 211 to the bottom 212 of leader block 101. Also included in leader block 101 is a first lead-in chamfer 231 and second lead-in chamfer 232 which function to guide leader block retainer detents located on exterior housing 117 as described below.

Leader Block Retainer Mechanism

Figure 1A:
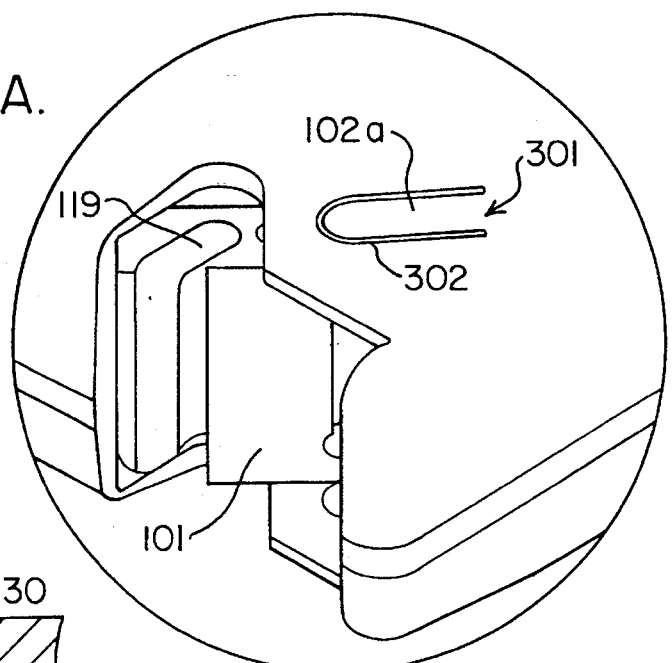
FIG. 1A illustrates, in an enlarged perspective view, the leader block retainer mechanism of the present invention.

A leader block retainer mechanism includes a plurality of detent members to retain leader block 101 in opening 121. As illustrated in FIGS. 1A, 3 and 4, in the preferred embodiment, a pair of detent members 102a, 102b, one located on each of the top 401 and bottom 402 sides of the exterior housing 117 of the magnetic tape cartridge 100 and located juxtaposed to opening 121, are used to retain leader block 101 within exterior housing 117. These detent members 102a, 102b are each attached at a first end 301 to the exterior housing 117 while the second end 302 is free to move in a direction that is perpendicular to the top 401 and bottom 402 sides of the magnetic tape cartridge exterior housing 117 to encounter the leader block 101. The detent members 102a, 102b are preferably molded as part of housing 117 in a manner to create a spring at the first end 301 attached to the top 401 side and bottom 402 side, respectively, of exterior housing 117. The detent members 102a, 102b are substantially rectangular in shape, having a curved second end 302 distal from the first end 301 thereof. The second end 302 of detent members 102a and 102b can include a semispherical projecting detent 103a, 103b to engage mating features 221, 222, 231, 232 on leader block 101.

The thus formed springs bias the projecting detents 103a, 103b in a position such that they encounter lead-in chamfers 231, 232, respectively, located on top 211 and bottom 212 of leader block 101 at second side 216 as it is being withdrawn into exterior housing 117 via opening 121. As the lead-in chamfers 231, 232 on the tape attaching end 216 of leader block 101 encounter the semispherical detents 103a, 103b on the second end 302 of detent members 102a, 102b, they force the detent members 102a, 102b to move in a direction away from leader block 101 to enable leader block 101 to enter opening 121. Lead-in chamfers 231, 232 are ramp-shaped to gradually deflect detents 103a, 103b to enable leader block 101 to enter opening 121. Once leader block 101 is completely seated within opening 121 of exterior housing 117, the detents 103a, 103b seat within corresponding recesses formed by features 221, 222, 231, 232 on leader block 101 to thereby remove the pressure from detent members 102a, 102b and securely hold leader block 101 in place within opening 121.

As can be seen from FIGS. 3 and 4, the detent members 102a, 102b maintain leader block 101 in a precise vertical position therebetween as well as seating leader block 101 against leader block guide surface 130 contained within exterior housing 117 via the force exerted by detent members 102a, 102b against retaining ribs 221, 222, respectively. The action of detent members 102a, 102b thereby precisely positions leader block 101 in three dimensions as well as retaining leader block 101 within opening 121 by resisting the movement of leader block 101 via the force exerted on leader block 101 through the spring action of the detent members 102a, 102b and the pressure applied to the top 211 and bottom 212 surfaces of leader block 101 by the semispherical detents 103a, 103b of detent members 102a and 102b.

For leader block 101 to be withdrawn from exterior housing 117, a force must be applied to the end of leader block 101 that is exposed through opening 121. This is typically accomplished by a tape threading arm in the tape drive engaging the threading arm slot 119 in leader block 101 and applying a force to leader block 101 to pull leader block 101 out of exterior housing 117 in the direction indicated by the arrow A on FIG. 3. The magnitude of this withdrawal force must be great enough to overcome the retaining force exerted on leader block 101 by detents 103a and 103b. This force must be sufficient to overcome the biasing force of the spring formed by the detent members 102a and 102b to cause detents 103a and 103b to deflect in a vertical direction away from leader block 101 to enable the ridges of lead-in chamfers 231, 232 on the second end 216 of leader block 101 to clear the space between detents 103a and 103b. To accomplish this in a smooth manner, the detents 103a, 103b on detent members 102a and 102b are selected to be semispherical in shape to enable leader block 101 to slide between the detents 103a, 103b. It is obvious that other curvilinear or ramped surfaces can be used on both detents 103a, 103b and lead-in chamfers 231, 232 of leader block 101 to accomplish smooth movement of leader block 101 between detents 103a and 103b.

Summary

The leader block retainer mechanism of this invention functions to resist the withdrawal of the leader block from the housing of the magnetic tape cartridge to prevent the inadvertent withdrawal therefrom. The use of a pair of detent members molded as part of the housing simplify the construction of this apparatus, minimizes the number of parts required and also enables the precise positioning of the detent members to precisely position the leader block within the housing when it is withdrawn into the opening as a result of the tape rewind operation.

While a specific embodiment of this invention has been disclosed, it is expected that those skilled in the art can and will design alternate embodiments of this invention that fall within the scope of the appended claims.

We claim:

1. A magnetic tape cartridge, comprising:

a substantially rectangular housing having a top side parallel to a bottom side, said top side and said bottom side being joined by a plurality of sidewalls, said plurality of sidewalls being substantially perpendicular to said top side and said bottom side, which housing has an opening in one corner thereof and is adapted to enclose a single reel of magnetic tape rotatably mounted in a parallel plane between said top side and said bottom side, and including a leader block;

said leader block having a first end and a second end, said first end being attached to one end of said magnetic tape and said second end having a leader block retrieval slot attached thereto, and a first retainer engagement surface opposite a second retainer engagement surface both located between said first end and said second end, said first retainer engagement surface being adjacent to and in a parallel plane as said top side and said second retainer engagement surface being adjacent to and in a parallel plane with said bottom side; and leader block retainer means located adjacent to said opening and formed as part of and surrounded by at least one of said top side and said bottom side, and operable to resist extraction of said leader block from said housing by independently engaging said at least one of said first retainer engagement surface and said second retainer engagement surface.

2. The magnetic tape cartridge of claim 1 wherein said leader block retainer means comprises:

retainer arm means connected at a first end to said housing juxtaposed to said opening and having a second end operable into a first position to resist movement of said leader block through said opening in said housing.

3. The magnetic tape cartridge of claim 2 wherein said leader block retainer arm means is connected to said housing at said first end and provides a spring for biasing said retainer arm means into said first position wherein said second end of said retainer arm means resists movement of said leader block through said opening in said housing.

4. The magnetic tape cartridge of claim 2 wherein said second end of said retainer arm means includes a projection adapted to engage a feature on said leader block to resist movement of said leader block through said opening in said housing.

5. The magnetic tape cartridge of claim 2 wherein said retainer arm means is responsive to a force in excess of a predetermined magnitude applied to said leader block in a direction to extract said leader block from said housing via said opening for translating into a second position to enable movement of said leader block through said opening.

6. The magnetic tape cartridge of claim 1 further comprising:

second leader block retainer means located within said housing juxtaposed to said opening, on a second of said top side and said bottom side, and operable to resist extraction of said leader block from housing.

7. The magnetic tape cartridge of claim 6 wherein said second leader block retainer means comprises:

retainer arm means connected at a first end to said housing juxtaposed to said opening and having a second end operable into a first position to resist movement of said leader block through said opening in said housing.

8. The magnetic tape cartridge of claim 7 wherein said leader block retainer arm means is connected to said housing at said first end and provides a spring for biasing said retainer arm means into said first position wherein said second end of said retainer arm means resists movement of said leader block through said opening in said housing.

9. The magnetic tape cartridge of claim 7 wherein said second end of said retainer arm means includes a projection adapted to engage a feature on said leader block to resist movement of said leader block through said opening in said housing.

10. A magnetic tape cartridge, comprising:

a substantially rectangular housing having a top side parallel to a bottom side, which housing has an opening in one corner thereof and is adapted to enclose a single reel of magnetic tape rotatably mounted in a parallel plane between said top side and said bottom side, and including a leader block attached to one end of said magnetic tape;

first retainer means adjacent to said opening formed as part of said top side itself, having a first end operable into a first position to resist movement of said leader block through said opening in said housing; and second retainer means adjacent to said opening formed as part of said bottom side, having a first end operable into a first position to resist movement of said leader block through said opening in said housing.

11. The magnetic tape cartridge of claim 10 wherein said first and said second retainer means are each connected to said housing to provide a spring for biasing said first and said second retainer means into said first position.

12. The magnetic tape cartridge of claim 10 wherein said first end of each of said first and said second retainer means includes a projection adapted to engage a feature on said leader block to resist movement of said leader block through said opening in said housing.

13. The magnetic tape cartridge of claim 10 wherein said first and said second retainer means are each responsive to a force in excess of a predetermined magnitude applied to said leader block in a direction to extract said leader block from said housing via said opening for translating into a second position to enable movement of said leader lock through said opening.

* * * * *

UNITED STATES PATENT AND TRADEMARK OFFICE
CERTIFICATE OF CORRECTION

PATENT NO.    :  5,465,187

DATED         :  November 7, 1995

INVENTOR(S)   :  HOGE, KONSHAK, OWENS, JOHNSON, RAMBOSEK, RIEGER

It is certified that error appears in the above-identified patent and that said Letters Patent is hereby corrected as shown below:

On title page,
Item, [73] change as follows:

--Assignees:   Storage Technology Corporation,
Louisville, Colorado
Minnesota Mining & Manufacturing Company,
Saint Paul, Minnesota--

Signed and Sealed this

Third Day of December, 1996

Attest:

BRUCE LEHMAN

*Attesting Officer*    Commissioner of Patents and Trademarks